(12) United States Patent
Kim

(10) Patent No.: US 9,922,195 B2
(45) Date of Patent: Mar. 20, 2018

(54) IMAGE PROCESSING APPARATUS AND CONTROL METHOD THEREOF

(71) Applicant: SAMSUNG ELECTRONICS CO., LTD., Suwon-si (KR)

(72) Inventor: Je-ik Kim, Yongin-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 127 days.

(21) Appl. No.: 14/748,380

(22) Filed: Jun. 24, 2015

(65) Prior Publication Data

US 2015/0378883 A1 Dec. 31, 2015

(30) Foreign Application Priority Data

Jun. 30, 2014 (KR) .................. 10-2014-0080934

(51) Int. Cl.
*G06F 12/02* (2006.01)
*G06F 21/57* (2013.01)

(52) U.S. Cl.
CPC ............ *G06F 21/575* (2013.01); *G06F 12/02* (2013.01)

(58) Field of Classification Search
None
See application file for complete search history.

(56) References Cited

U.S. PATENT DOCUMENTS

| | | | | |
|---|---|---|---|---|
| 5,523,859 A * | 6/1996 | Nakajima | .......... | H04N 1/32358 355/115 |
| 6,633,404 B1 * | 10/2003 | Atsumi | .................. | G06K 15/00 358/1.1 |
| 2004/0170274 A1 * | 9/2004 | Machida | .............. | H04N 1/4486 380/46 |
| 2005/0283566 A1 * | 12/2005 | Callaghan | ........... | G06F 12/1408 711/104 |
| 2006/0117177 A1 * | 6/2006 | Buer | ..................... | G06F 21/606 713/155 |
| 2006/0136723 A1 * | 6/2006 | Taylor | ................... | G06T 1/0028 713/168 |
| 2006/0253831 A1 * | 11/2006 | Harper | ...................... | G06F 9/54 717/106 |
| 2006/0272022 A1 * | 11/2006 | Loukianov | ............ | G06F 21/575 726/26 |
| 2007/0033419 A1 * | 2/2007 | Kocher | ................... | G06F 21/10 713/193 |

(Continued)

*Primary Examiner* — Mano Padmanabhan
*Assistant Examiner* — Jean Edouard
(74) *Attorney, Agent, or Firm* — Sughrue Mion, PLLC

(57) ABSTRACT

An image processing apparatus and control method are provided. An image processing apparatus including: a storage configured to store data which is divided into a plurality of units of code; a random access memory (RAM) configured to be loaded with the data; a central processing unit (CPU) configured to execute the data; and a storage controller configured to read a requested unit of code from the storage in response to receiving a request from the CPU for the unit of code to be currently executed, and load the read unit of code to the RAM so that the unit of code can be processed by the CPU, wherein the storage controller performs validation with regard to the unit of code when reading the unit of code from the storage, and loads the unit of code, when the validation passes, to the RAM.

15 Claims, 8 Drawing Sheets

(56) References Cited

U.S. PATENT DOCUMENTS

| | | | | |
|---|---|---|---|---|
| 2007/0106890 A1* | 5/2007 | Kwon | G06F 21/572 | 713/1 |
| 2007/0116266 A1* | 5/2007 | Greco | H04L 9/3236 | 380/28 |
| 2007/0150517 A1* | 6/2007 | Malone | G06F 17/30038 | |
| 2007/0300207 A1* | 12/2007 | Booth | G06F 21/575 | 717/126 |
| 2008/0229045 A1* | 9/2008 | Qi | G06F 3/0605 | 711/170 |
| 2008/0313453 A1* | 12/2008 | Booth | G06F 21/575 | 713/2 |
| 2009/0237725 A1* | 9/2009 | Hamaguchi | H04N 1/00222 | 358/1.15 |
| 2009/0285390 A1* | 11/2009 | Scherer | G06F 21/51 | 380/44 |
| 2010/0031012 A1* | 2/2010 | Rotondo | G06F 21/575 | 713/2 |
| 2011/0018692 A1* | 1/2011 | Smith | G06K 7/0008 | 340/10.4 |
| 2011/0182425 A1* | 7/2011 | Burnett | G06F 21/10 | 380/200 |
| 2011/0258426 A1* | 10/2011 | Mujtaba | G06F 21/57 | 713/2 |
| 2012/0060039 A1* | 3/2012 | Leclercq | G06F 21/10 | 713/189 |
| 2012/0303874 A1* | 11/2012 | Yamaguchi | G06F 12/1009 | 711/103 |
| 2012/0331303 A1* | 12/2012 | Andersson | G06F 21/56 | 713/189 |
| 2013/0124932 A1* | 5/2013 | Schuh | G06F 9/44 | 714/718 |
| 2013/0212370 A1 | 8/2013 | Fischer et al. | | |
| 2013/0275691 A1* | 10/2013 | Chew | G06F 12/00 | 711/154 |
| 2013/0276057 A1 | 10/2013 | Smith et al. | | |
| 2014/0298040 A1* | 10/2014 | Ignatchenko | G06F 21/575 | 713/192 |

* cited by examiner

IMAGE PROCESSING APPARATUS AND CONTROL METHOD THEREOF

CROSS-REFERENCE TO RELATED APPLICATION

This application claims priority from Korean Patent Application No. 10-2014-0080934, filed on Jun. 30, 2014 in the Korean Intellectual Property Office, the disclosure of which is incorporated herein by reference in its entirety.

BACKGROUND

Field

Apparatuses and methods consistent with the exemplary embodiments relate to an image processing apparatus capable of executing various pieces of data such as image data and a control method thereof, and more particularly to an image processing apparatus and a control method thereof, which is capable of shortening time which is increased and delayed due to security checks on a data code when a secure booting is performed.

Description of the Related Art

An image processing apparatus processes an image signal and/or image data which is received externally in accordance with a variety of image processing techniques. The image processing apparatus displays the processed image data as an image on its own display panel, or outputs the processed image data to a display apparatus having a display panel so that the display apparatus can display the received image data as the image. That is, the image processing apparatus may have a display panel or may not have a display panel so long as it can process the image data. For example, an image processing apparatus with a display panel includes a television (TV), and an image processing apparatus without a display panel includes a set-top box.

When system power is on and thus the image processing apparatus is booted up, a binary code of various pieces of data such as an operating system is executed. With the development of technology, additions and extensions to various functions have been continuously reflected to the image processing apparatus, and the length of binary codes executed during the booting has also increased. The increase in the length of binary codes results in increasing the amount of time necessary during the booting process and delays the booting.

With a recent trend of taking a count of general electronic devices, the image processing apparatus performs secure booting, to which various security methods are applied, in order to prevent arbitrarily falsified data from being executed during the booting. However, the secure booting delays the booting of the image processing apparatus since security checks have to be applied to the binary code before executing the corresponding binary code.

Accordingly, it is desired to shorten the booting time while performing the secure booting when the image processing apparatus is booted up.

SUMMARY

According to an aspect of an exemplary embodiment, there is provided an image processing apparatus including: a storage configured to store therein data which is divided into a plurality of units of code; a random access memory (RAM) configured to be loaded with the data stored in the storage; a central processing unit (CPU) configured to execute the data by processing a unit of code of the plurality of units of code of the data loaded to the RAM; and a storage controller configured to read a requested unit of code from the storage in response to receiving a request from the CPU for the unit of code to be currently executed among the plurality of units of code, and load the read unit of code to the RAM so that the unit of code can be processed by the CPU, wherein the storage controller performs validation with regard to the unit of code when reading the unit of code from the storage, and loads the unit of code, when the validation passes, to the RAM.

The storage controller may perform the validation for each unit of code, based on a preset validation code corresponding to each of the plurality of units of code.

The validation code may be generated and set by converting unfalsified data of the data based on a preset algorithm, and wherein the storage controller may convert the unit of code in accordance with the preset algorithm, and may compare the converted code with the validation code in order to determine whether the unit of code is falsified.

The validation code may include a hash code based on a hash function.

The data may be compressed and stored in the storage in a preset compression format according to the units of code, and wherein the storage controller may perform the validation based on the validation code which is individually set to correspond to the compressed units of code, decompress the unit of code, when the validation passes, and loads the decompressed units of code to the RAM.

The data may be encrypted according to the respective units of code and stored in the storage, and wherein the storage controller may decrypt the encrypted units of code based on a preset decryption key, and load the units of code which are decrypted normally to the RAM.

The CPU may make a request for the unit of code needed for executing the data among the plurality of units of code to the storage controller, and may execute the unit of code which is loaded in the RAM in response to the request.

The image processing apparatus may further include a buffer configured to temporarily store the unit of code when the storage controller performs the validation with regard to the unit of code read from the storage.

According to an aspect of another exemplary embodiment, there is provided a method of controlling an image processing apparatus, the method including: storing data which is divided into a plurality of units of code in a storage; reading a requested unit of code from the storage in response to a storage controller receiving the request for the unit of code to be currently executed among the plurality of units of code from a central processing unit (CPU), and loading the read unit of code to the RAM so that the unit of code can be processed by the CPU; and executing the data by processing the unit of code of the data loaded to the RAM through the CPU, wherein the loading the unit of code comprises performing, by the storage controller, validation with regard to the unit of code whenever reading the unit of code from the storage, and loading the unit of code, when the validation passes, to the RAM.

The validation may be performed for each unit of code, based on a preset validation code corresponding to each of the plurality of units of code.

The validation code may be generated and set by converting unfalsified data based on a preset algorithm, and the method further comprises preventing the data stored in the storage from being executed in a falsified state, wherein the preventing may include: converting the unit of code in accordance with the preset algorithm; and comparing the converted code with the validation code in order to determine whether the unit of code is falsified.

The validation code may include a hash code based on a hash function.

The data may be compressed and stored in the storage in a preset compression format according to the units of code, and the method further comprises preventing the data stored in the storage from being executed in a falsified state, wherein the preventing may include: performing the validation based on the validation code which is individually set to correspond to the compressed units of code; decompressing the units of code, when the validation passes, and loading the decompressed units of code to the RAM.

The data may be encrypted according to the respective units of code and stored in the storage, and the method further comprises preventing the data stored in the storage from being executed in a falsified state, wherein the preventing may include: decrypting the encrypted units of code based on a preset decryption key, and loading the normally decrypted units of code to the RAM.

When the storage controller performs the validation with regard to the unit of code read from the storage, the unit of code may be temporarily stored in a separate buffer.

BRIEF DESCRIPTION OF THE DRAWINGS

The above and/or other aspects will become apparent and more readily appreciated from the following description of exemplary embodiments, taken in conjunction with the accompanying drawings, in which.

DETAILED DESCRIPTION OF EXEMPLARY EMBODIMENTS

Below, exemplary embodiments will be described in detail with reference to accompanying drawings. In the following exemplary embodiments, only elements directly related to the exemplary embodiment will be described, and descriptions about the other elements will be omitted. However, it will be appreciated that the elements, the descriptions of which are omitted, are not unnecessary to realize the apparatus or system according to the exemplary embodiments.

Figure 1:
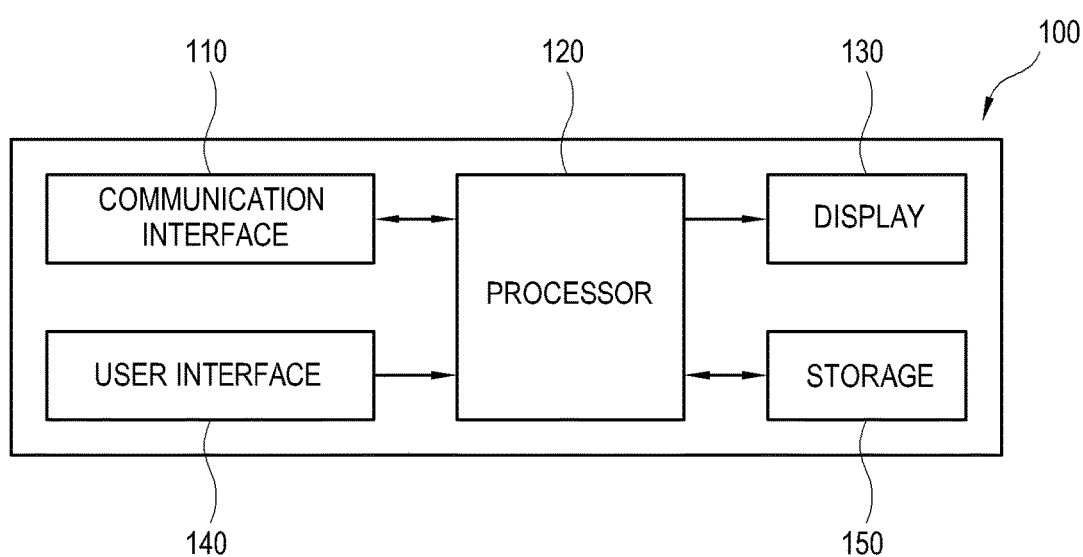
FIG. 1 is a block diagram of an image processing apparatus according to a first exemplary embodiment.

FIG. 1 is a block diagram of an image processing apparatus 100 according to a first exemplary embodiment.

As shown in FIG. 1, an image processing apparatus 100 according to this exemplary embodiment may be achieved by a display apparatus which is capable of displaying an image by itself, such as a television (TV). However, the exemplary embodiment is not limited to a display apparatus and may be applied to a set-top box or the like that cannot display an image by itself or can be applied to an electronic device which has various functions. Thus, the exemplary embodiment is not limited to the following descriptions.

The image processing apparatus 100 processes image data which is received externally in real time, or initially stores image data and then processes the image data after a designated point of time, thereby displaying an image. When a system is powered on, the image processing apparatus 100 is booted up and executes general data required for operating the image processing apparatus 100, such as an operating system. After the booting is completed, the image processing apparatus 100 executes various applications based on the operating system and provides functions desired by a user.

The image processing apparatus 100 includes a communication interface 110 which communicates externally with, for example, other devices or servers, in order to transmit and receive data or a signal, a processor 120 which processes the data received in the communication interface 110 in accordance with a preset process, a display 130 which displays image data as an image if the data processed by the processor 120 is the image data, a user input interface 140 through which a user's input operation is performed, and a storage 150 which stores data or information.

The communication interface 110 transmits or receives data so that interactive communication can be performed between the image processing apparatus 100 and an external device such as a server or the like (not shown). The communication interface 110 accesses the external device (not shown) through a wired or wireless wide or local area network or locally in accordance with preset communication protocols.

The communication interface 110 may be achieved by connection ports according to devices or an assembly of connection modules, in which the protocol for connection or a target for connection is not limited to one kind or type of external device. The communication interface 110 may be internally provided in the image processing apparatus 100, but is not limited thereto. Alternatively, the entire communication interface 110 or a part of the communication interface 110 may be added to the image processing apparatus 100 in the form of an add-on or dongle type.

The communication interface 110 transmits or receives a signal in accordance with protocols designated according to the connected devices, in which the signals can be transmitted or received based on individual connection protocols with regard to the connected devices. In the case of image data, the communication interface 110 may transmit or receive the signal bases on various standards such as a radio frequency (RF) signal, composite/component video, super video, Syndicat des Constructeurs des Appareils Radiorécepteurs et Téléviseurs (SCART), high definition multimedia interface (HDMI), display port, unified display interface (UDI), or wireless HD, etc.

The processor 120 performs various processes with regard to data received in the communication interface 110. If the communication interface 110 receives the image data, the processor 120 applies an imaging process to the image data and the image data processed by this process is output to the display 130, thereby allowing the display 130 to display an image based on the corresponding image data. If the signal received in the communication interface 110 is a broadcasting signal, the processor 120 extracts video, audio and appended data from the broadcasting signal tuned to a certain channel, and adjusts an image to have a preset resolution, so that the image can be displayed on the display 130.

There is no limit to the kind of imaging processes to be performed by the processor 120. For example, there are decoding processes corresponding to an image format of the image data, de-interlacing processes for converting the image data from an interlace type into a progressive type, scaling processes for adjusting the image data to have a preset resolution, noise reduction processes for improving image qualities, detail enhancement processes, frame refresh rate conversion processes, etc.

The processor 120 may perform various processes in accordance with the kinds and attributes of the data, and thus the process to be implemented in the processor 120 is not limited to imaging processes. Also, the data which can be processed in the processor 120 is not limited to only data which is received in the communication interface 110. For example, the processor 120 performs a preset operation or function in response to a control command if the control command corresponding to a user's control is input through a user input interface 140.

The processor 120 may be an individual chip-set capable of independently performing each process, a group of modules according to functions, which can be implemented in hardware, or a system-on-chip where various functions are integrated.

The display 130 displays the video signal or the image data processed by the processor 120 as an image. The display 130 may be achieved by various types of displays such as liquid crystal, plasma, a light-emitting diode, an organic light-diode, a surface-conduction electron-emitter, a carbon nano-tube and a nano-crystal, but the exemplary embodiments are not limited thereto.

The display 130 may additionally include an appended element in accordance with the type of display. For example, in the case of the liquid crystal type, the display 130 may include a liquid crystal display (LCD) panel, a backlight unit which emits light to the LCD panel, a panel driving substrate which drives the panel, etc.

The user input interface 140 transmits a variety of preset control commands or information to the processor 120 in accordance with a user's control or input. The user input interface 140 may generate information corresponding to various events that occur in accordance with a user's intent and transmits it to the processor 120. Here, the events generated by a user may be given in many forms, for example, a user control using a remote controller, a user's speech, a user's gesture, etc.

The storage 150 stores various pieces of data under control of the processor 120. The storage 150 can be a nonvolatile memory such as a flash memory, a hard disk drive, etc. so as to retain data regardless of whether the system is powered on or off. The storage 150 is accessed by the processor 120 so that previously stored data can be read, recorded, deleted, updated, and so on.

With this structure, the image processing apparatus 100 is booted when system power is on. While being booted up, data operating the image processing apparatus 100, for example, binary codes of an operating system and other various applications are executed. When completely booted up, the image processing apparatus 100 can perform general operations such as transmission of various pieces of data externally through a communication interface 110 or processes the image data to be displayed as an image on the display 130.

Below, the processor 120 and the storage 150 will be described in more detail with reference to FIG. 2.

Figure 2:
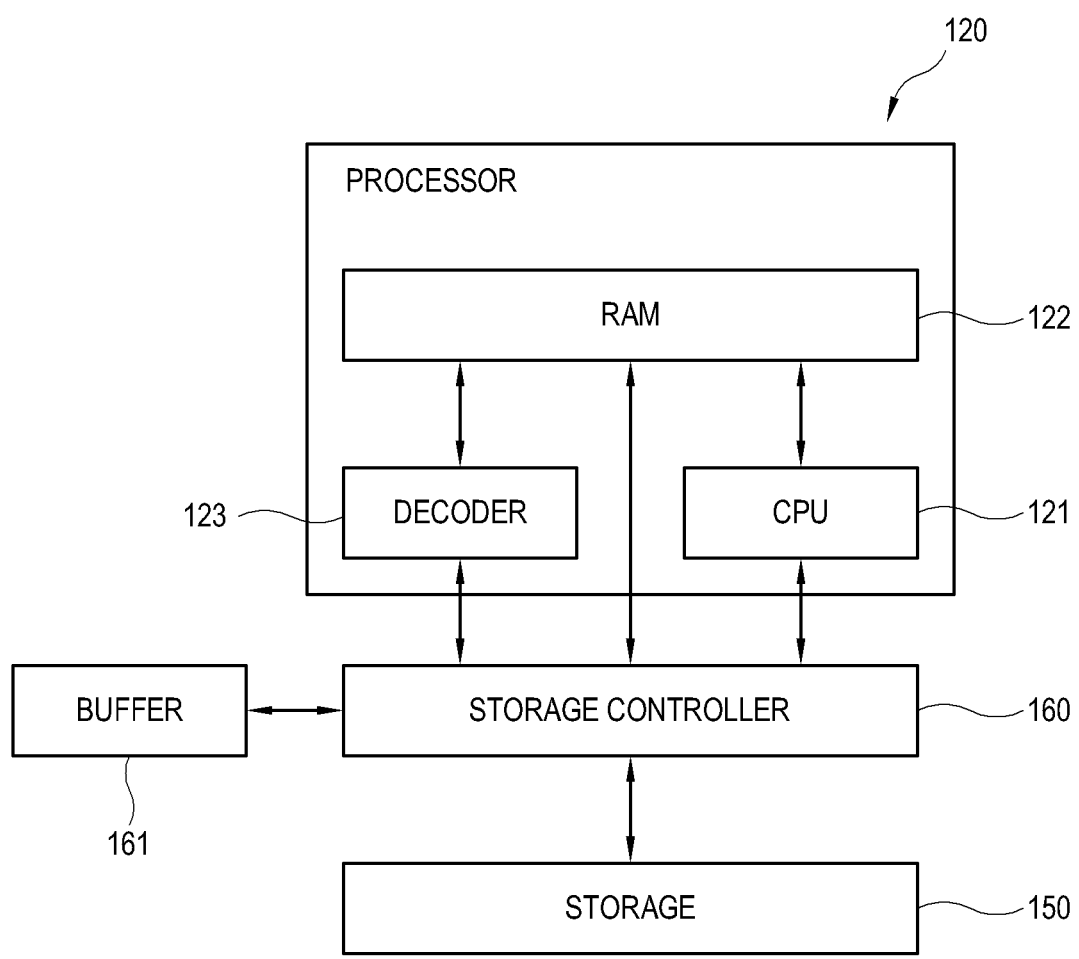
FIG. 2 is a block diagram of a processor and a storage in the image processing apparatus of FIG. 1, in accordance with an exemplary embodiment.

FIG. 2 is a block diagram of the processor 120 and the storage 150. In FIG. 2, only elements directly related to this exemplary embodiment are illustrated. In practice, the processor 120 and the storage 150 may additionally include elements not shown in this exemplary embodiment.

As shown in FIG. 2, the processor 120 includes a central processing unit (CPU) 121, a random access memory (RAM) 122 to which data executed by the CPU 121 is loaded, and a decoder 123 for decoding the image data.

The CPU 121 performs an operation for data processed by the processor 120, and executes software such as the operating system or the application. That is, operation of the software means that a code of the corresponding software is processed and executed by the CPU 121. The CPU 121 does not directly access data stored in the storage 150, and the data to be processed by the CPU is first loaded to the RAM 122. If the data to be processed while executing the application has not been loaded to the RAM 122, the CPU 121 makes a request for the corresponding data to a storage controller 160.

If the storage controller 160 receives the request for certain data stored in the storage 150 from various subordinate processing blocks (not shown) of the processor 120 such as the CPU 121 and the decoder 123, the storage controller 160 searches and acquires the data from the storage 150 and loads the corresponding data to the RAM 122. The storage controller 160 does not randomly load the data from the storage 150 to the RAM 122, but loads the data to an address area corresponding to an operation subject which made the request.

The storage controller 160 includes a buffer 161 in itself. If a predetermined process is needed for data before loading the corresponding data from the storage 150 to the RAM 122, the storage controller 160 controls the corresponding data to be temporarily loaded to and processed in the buffer 161, and loads the processed data to the RAM 122.

The RAM 122 is a volatile memory to which the data processed by the processor 120 is temporarily loaded, and includes storage areas which are sectioned according to addresses. When the image processing apparatus 100 is designed, the storage areas according to the addresses of the RAM 122 are assigned corresponding to the operation subjects accessing the RAM 122, for example, the CPU 121, the decoder 123, etc. For example, a range of a certain address area in the RAM 122 is assigned to the CPU 121, and a range of another address area is assigned to the decoder 123. The assigned address ranges of the RAM 122 may be differentiated, common, or partially shared between the operation subjects.

For example, the CPU 121 makes a request for data of a certain application to the storage controller 160 if it desires to execute the corresponding application. The storage controller 160 searches and acquires a data code of the application requested by the CPU 121 from the storage 150, and loads the acquired data code to the address area of the RAM 122 assigned to the CPU 121. If the data code is completely loaded, the storage controller 160 informs the CPU 121 that loading of the data code is completed.

The CPU 121 access the address area of the RAM 122 assigned to the CPU 121 if the data code is completely loaded by the storage controller 160. The CPU 121 executes the data code acquired by accessing the RAM 122, thereby executing the application.

The decoder 123 and other subordinate processing blocks (not shown) of the processor 120 are operated likewise. If an application which is currently executed is an image reproducer and the application reproduces the image data stored in the storage, the decoder 123 makes a request for the image data stored in the storage 150 to the storage controller 160. The storage controller 160 loads the requested image data from the storage 150 to the RAM 122. The decoder 123 access the address area assigned to the decoder 123 and acquires and decodes the image data loaded to the RAM 122.

Below, a booting procedure of the image processing apparatus 100 will be described with reference to FIG. 3.

Figure 3:
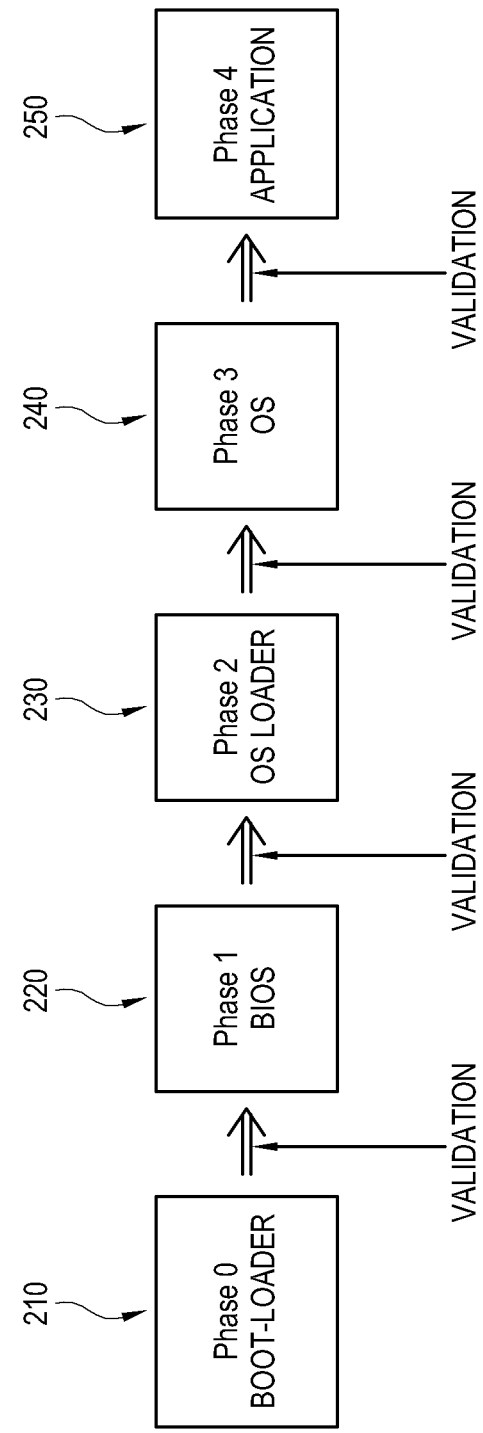
FIG. 3 is a block diagram schematically showing booting phases of the image processing apparatus of FIG. 1, in accordance with an exemplary embodiment.

FIG. 3 is a block diagram showing schematically showing booting phases of the image processing apparatus. In FIG. 3, only some phases among many phases of the booting are illustrated for simply explaining this exemplary embodiment. In practice, the procedure of booting up the image processing apparatus 100 may be more complicated and include other operations than that illustrated in FIG. 3.

As shown in FIG. 3, when a system is powered on, data which is needed for activating the system of the image processing apparatus 100 is executed in sequence. Each of the code for the data is stored in a separate memory (not shown) such as the storage 150 of the image processing apparatus 100 or a read only memory (ROM), and is called during booting and loaded.

For example, when the system is powered on, the CPU 121 executes a boot-loader at a phase 0 (210). As the boot-loader is executed, the CPU 121 executes basic input/output system (BIOS) at a phase 1 (220). The CPU 121 executes an operating system (OS) loader at a phase 2 (230), and thus executes the OS at a phase 3 (240). When the execution of the OS is completed, the CPU 121 executes an application operating based on the OS at a phase 4 (250). Thus, a series of booting phases are completed.

However, if the data executed during the booting is arbitrarily falsified, the falsified data is directly reflected in a general booting procedure. Accordingly, secure booting may be applied in order to prevent the execution of the falsified data and enhance the security of the image processing apparatus 100.

Secure booting applies a data validation method to the booting procedure. The secure booting may be achieved in various ways. As one example of the secure booting, the CPU 121 first validates the data executed in phases 220, 230, 240 and 250 before entering the respective phases 220, 230, 240 and 250. Therefore, when the data corresponding to each phase 220, 230, 240 and 250 is falsified, the corresponding data is prevented from being executed in the following booting phase.

For example, the CPU 121 performs the validation for the binary code of the BIOS after the phase 0 (210) and before the phase 1 (220), and enters the phase 1 (220) and executes the BIOS if the validation is passed. In addition, the CPU 121 performs the validation for the OS loader after the phase 1 (220) and before the phase 2 (230), and enters the phase 2 (230) and executes the OS loader if the validation is passed. Likewise, the validation is also performed in the phases 240 and 250.

The boot-loader executed in the first phase 0 (210) is stored in the ROM (not shown) in which falsification is not possible, and the CPU 121 executes the boot-loader in the phase 0 (210) without previous validation.

The validation of the binary code may be achieved by various methods. The validation for the binary code will be described with reference to FIG. 4.

Figure 4:
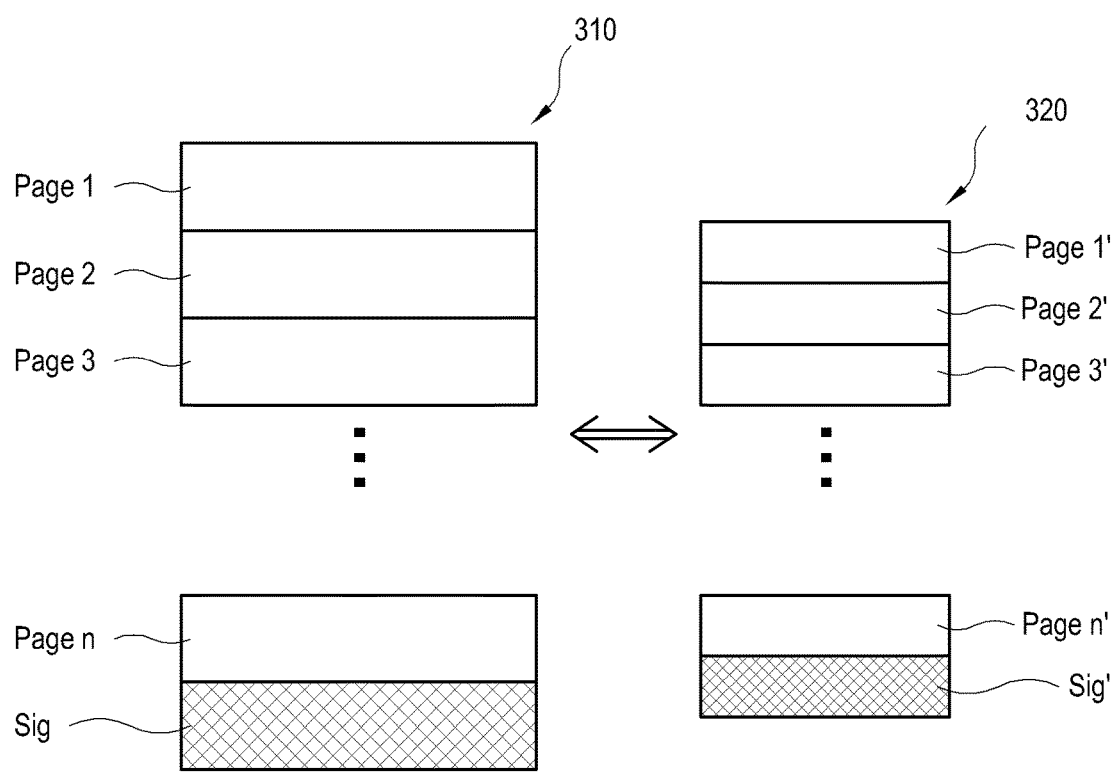
FIG. 4 shows an example showing formats of data in the image processing apparatus of FIG. 1, in accordance with an exemplary embodiment.

FIG. 4 shows an example showing formats of data in the image processing apparatus of FIG. 1, in accordance with an exemplary embodiment.

As shown in FIG. 4, all of the data, which includes a series of binary codes and is provided in units of an application, is regarded as one data image 310. One data image 310 may be divided into a plurality of units according to logical divisions for execution, which will be called pages (e.g., Page 1, Page 2, Page 3, . . . , Page n). That is, the binary codes which make up the entire data image 310 is divided into the plurality of pages (e.g., Page 1, Page 2, Page 3, . . . , Page n).

The data image 310 is attached with a signature Sig based on the entire corresponding data image 310, that is, attached with the signature Sig based on the binary codes of all the pages (Page 1, Page 2, Page 3, . . . Page n). The signature Sig is a reference code set for determining whether the binary codes of the entire data image 310 are falsified. Specifically, it is determined whether the binary codes is falsified by processing the binary codes of the entire data image 310 in accordance with a preset algorithm. The algorithm may employ various publicly known techniques, for example, a hash function of converting the binary code of the data image 310 into a hash code. The hash function is an algorithm for mapping data of an arbitrary length into data of a fixed length. Detailed descriptions of the hash function will be omitted since the hash function has been publicly known.

The CPU 121 compares the signature Sig with the code which results from processing the binary code of the data image 310 in accordance with the algorithm of generating the signature Sig, at the validation. If the data image 310 is not falsified, the corresponding resulting code is the same as the code of the signature Sig. On the other hand, if the binary code of the data image 310 is partially falsified, the corresponding resulting code is different from the code of the signature Sig. In this way, the CPU 121 determines whether the data image 310 is falsified or not.

The storage 150 may directly store the data image 310, but may compress the data image 310 in a preset compression format in order to increase the storage capacity of the storage 150 and then store the compressed data. The preset compression format may be based on various known techniques.

If the data image 320 is compressed and then stored in the storage 150, the corresponding data image 320 is decompressed and then loaded to the RAM 122.

The data image 320 may be compressed in units of pages (e.g., Page 1', Page 2', Page 3', . . . , Page n'). The respective pages (e.g., Page 1', Page 2', Page 3', . . . , Page n') may have a different in size after the compression in accordance with characteristics of their binary codes even though they have the same size before the compression.

The signature Sig' may be generated based on the binary codes of the data image 310 before the compression, and may be generated based on the binary code of the data image 320 after the compression. In the former case, the CPU 121 has to first decompress the compressed data image 320 and then perform the validation. In the latter case, the CPU 121 may perform the validation before decompressing the compressed data image 320. The latter has a smaller total size of data than the former, and thus has an advantage of relatively shortening the time required in acquiring the codes resulting from processing the binary code of the data image 320 in accordance with the preset algorithm.

Below, a method of validating a data image by the CPU 121 according to an exemplary embodiment will be described with reference to FIG. 5.

Figure 5:
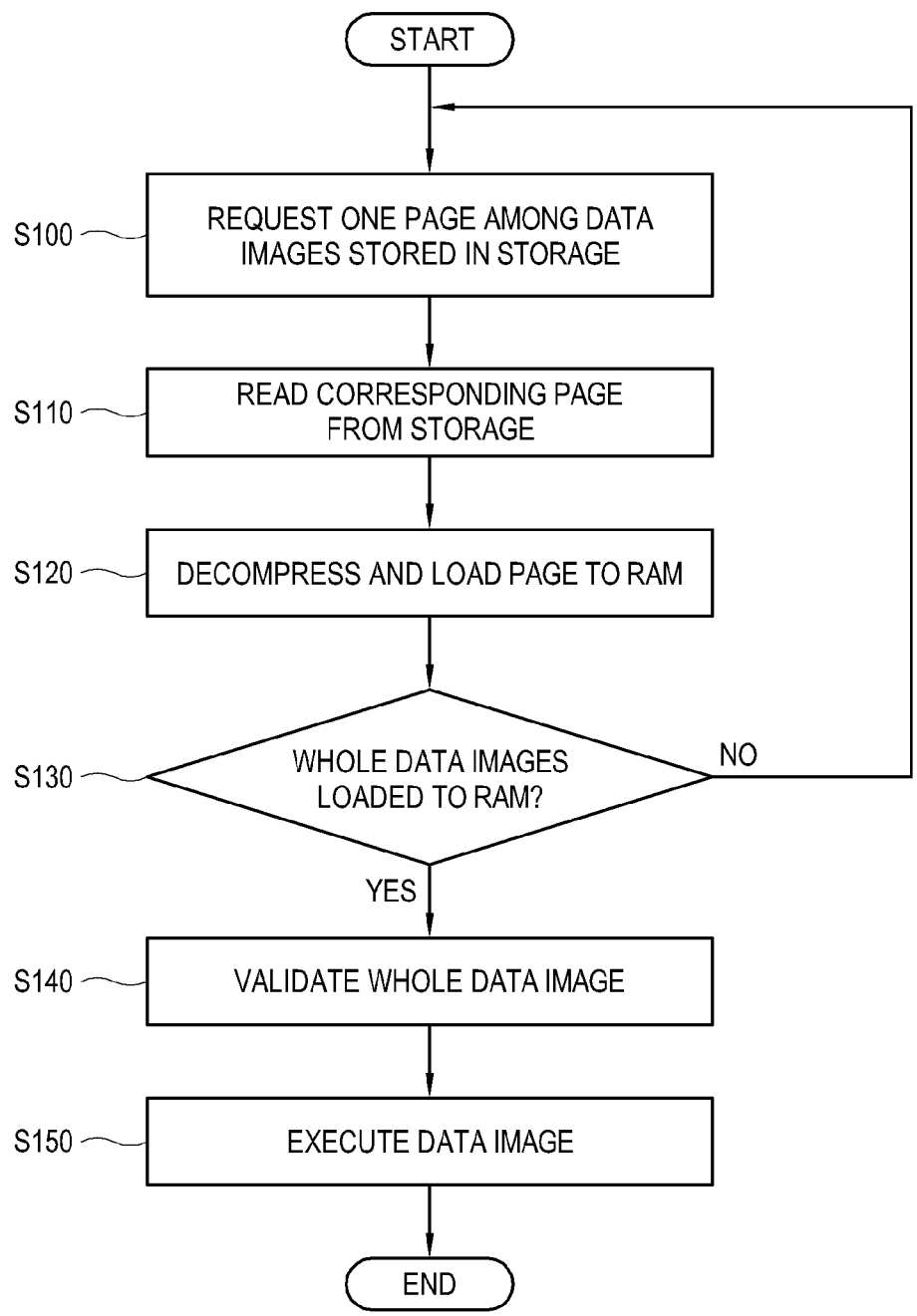
FIG. 5 is a flowchart showing a method of controlling the image processing apparatus of FIG. 1, in accordance with an exemplary embodiment.

FIG. 5 is a flowchart showing a method of controlling the image processing apparatus 100.

As shown in FIG. 5, at operation S100 the CPU 121 makes a request for a page among the data images stored in the storage 150 to the storage controller 160.

At operation S110, the storage controller 160 reads the corresponding page from the storage 150. If the corresponding page is a compressed page, the storage controller 160 decompresses the page and then loads the decompressed page to the RAM 122 at operation S120.

At operation S130, the CPU 121 determines whether the data image is entirely loaded to the RAM 122. If it is determined that the data image is not entirely loaded to the RAM 122, the CPU 121 returns to operation S100 and repeats reading and loading the other pages of the data image.

If it is determined that the entire data image is loaded to the RAM 122, at operation S140, the CPU 121 validates the entire data image. If the validation is completed, at operation S150 the CPU 121 executes the data image loaded to the RAM 122.

As described above, the CPU 121 in this exemplary embodiment loads the entire data image to the RAM 122 and then validates the entire data image. However, if such operations are performed during the booting, the entire data image has to be previously loaded to the RAM 122. Therefore it takes a lot of time to do the booting, and the booting is delayed. For example, if the binary code of the application is of 200 MB in phase 4 (250) of FIG. 3, it takes 5 seconds to load the corresponding code to the RAM 122 and it also takes 5 seconds to validate the corresponding code. In other words, the application can be executed after waiting 10 seconds.

Thus, the booting is delayed under the secure booting in the first exemplary embodiment. To minimize the delay during the booting in the first exemplary embodiment, a second exemplary embodiment will be provided.

Below, the second exemplary embodiment will be described. In the second exemplary embodiment, a structure of the image processing apparatus 100 may employ that of the first exemplary embodiment.

Figure 6:
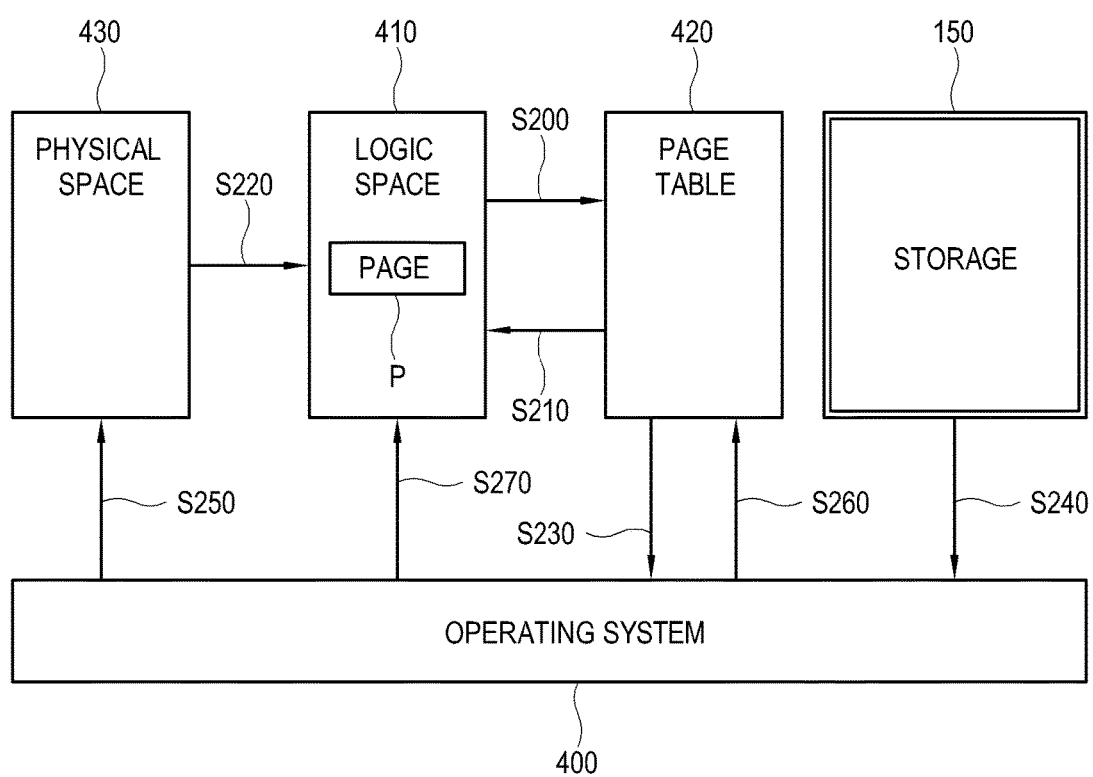
FIG. 6 is a concept view showing a principle in which an application is executed based on an operating system according to a second exemplary embodiment.

FIG. 6 is a concept view showing a principle in which an application is executed based on an operating system 400.

As shown in FIG. 6, the CPU 121 or the operating system 400 executes a data image such as an application, etc.

The CPU 121 does not load all of the binary codes of the application to the RAM 122 in order to execute the application, but loads only some binary codes for execution to the RAM 122 on each occasion. That is, since some binary codes among all of the binary codes are sequentially executed while the application is executed, the CPU 121 selects only the binary codes needed for executing the application among all of the binary codes and loads the selected binary codes to the RAM 122.

For example, if the CPU 121 executes a binary code of a page P while executing an application of a logic space 410. The CPU 121 accesses a page table 420 and searches an address of a physical space 430 in the RAM 122 corresponding to the binary code (S200). The page table 420 is a table where the binary code of the logic space 410 is mapped onto the address of the physical space 430 of the RAM 122.

If the page table 420 has an address of the physical space 430 which corresponds to the page P (S210), the CPU 121 can access the corresponding address and read the binary code of the corresponding page P (S220).

On the other hand, if the page table 420 does not have an address of the physical space 430 corresponding to the page P, that is, if the page P is not loaded to the RAM 122, the CPU 121 cannot read the binary code of the corresponding page P at this point in time. This case will be called the occurrence of a trap.

If the trap occurs (S230), the CPU 121 reads the binary code of the page P, in which the trap occurs, from the storage 150 through the operating system 400 (S240). The CPU 121 controls the read binary code to be loaded to the physical space 430 (S250), and updates the page table 420 with the loaded address of the physical space 430 (S260). Then, the CPU 121 triggers the execution of the corresponding page P again (S270).

When the page P is executed in the logic space 410, the page table 420 includes the address of the physical space 430 corresponding to the page P, and thus the corresponding page P can be executed. The CPU 121 repeats such operations while executing the application.

If such processes are executed during the booting, it is possible to decrease the booting time than the booting time of when the whole application is loaded to the RAM 122 and then executed.

In operation S240 of loading the page P, in which the trap occurs, from the storage 150 to the RAM 122, the storage controller 160 first performs the validation with regard to the page P which is temporarily loaded to the buffer 161. If the validation is completed with regard to the page P, the storage controller 160 loads the page P to the RAM 122.

In the second exemplary embodiment, since the validation has to be performed with respect to each page P, and not the entire application, the signature for the validation is provided in each page as opposed to that of the first exemplary embodiment (see FIG. 4). If the page is compressed and stored in the storage 150, the signature corresponding to the page may be generated based on the compressed state of the page or generated based on the uncompressed state of the page.

As compared to the first exemplary embodiment where the validation is performed with regard to all of the data image after loading all of the data image to the RAM 122 during the secure booting, in the second exemplary embodiment only some and not all of the data image of data needed for the current execution are validated and then loaded to the RAM 122. Thus, the image processing apparatus 100 according to the second exemplary embodiment decreases the time taken in the secure booting as compared with that of the first exemplary embodiment.

In addition, if the page P is in a compressed state, the storage controller 160 decompresses the page P before or after the validation. If the signature for the validation which is generated corresponds to the compressed page P, the storage controller 160 decompress the page P after validating the compressed page P. On the other hand, if the signature for the validation which is generated corresponds to the uncompressed page P, the storage controller 160 performs the validation after decompressing the page P. However, this is merely exemplary and the decompression and validation can be performed in various ways.

Figure 7:
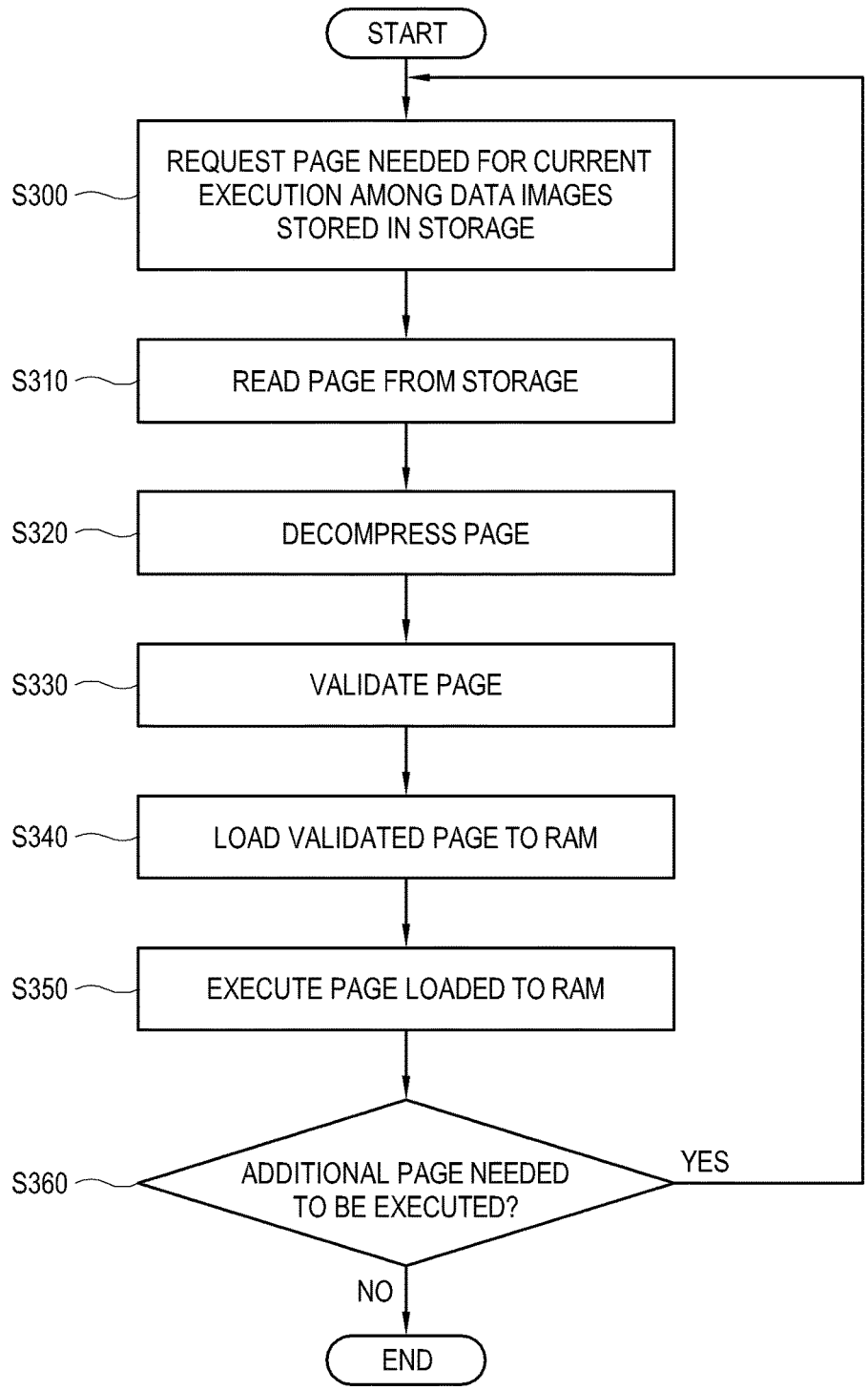
FIG. 7 is a flowchart showing a method of controlling an image processing apparatus according to a second exemplary embodiment.

FIG. 7 is a flowchart showing a method of controlling the image processing apparatus 100 according to the second exemplary embodiment.

As shown in FIG. 7, at operation S300 the CPU 121 makes a request for a page to be currently executed among the data images stored in the storage 150 to the storage controller 160.

At operation S310, the storage controller 160 reads the corresponding page from the storage 150. At operation S320 the storage controller 160 decompresses the page if the page is a compressed page. At this time, the processing of the page by the storage controller 160 is performed in the buffer 161 and not in the RAM 122.

Further, at operation S330 the storage controller 160 validates the decompressed page. At operation S340 the storage controller 160 loads the validated page to the RAM 122 after the validation is completed.

At operation S350, the CPU 121 executes the page loaded to the RAM 122. As the corresponding page is executed, at operation S360 the CPU 121 determines whether there is an additional page to be executed. If it is determined that an additional page needs to be executed, the CPU 121 returns to operation S300 and repeats the same processes.

In brief, the storage controller 160 receives a request for a unit of code to be currently executed by the CPU 121 as the CPU 121 executes data including a plurality of units of code, and reads and loads the unit of code from the storage 150 to the RAM 122 whenever receiving the request. The storage controller 160 performs validation for a unit of code whenever reading the unit of code from the storage 150, and loads the unit of code, of which validation is passed, to the RAM 122.

Thus, during the secure booting including the execution of the corresponding data, it is possible to minimize the relative delay during the secure booting.

Below, a third exemplary embodiment will be described with reference to FIG. 8. As compared to the second exemplary embodiment, the third exemplary embodiment shows an example in which the data image stored in the storage 150 is encrypted.

Figure 8:
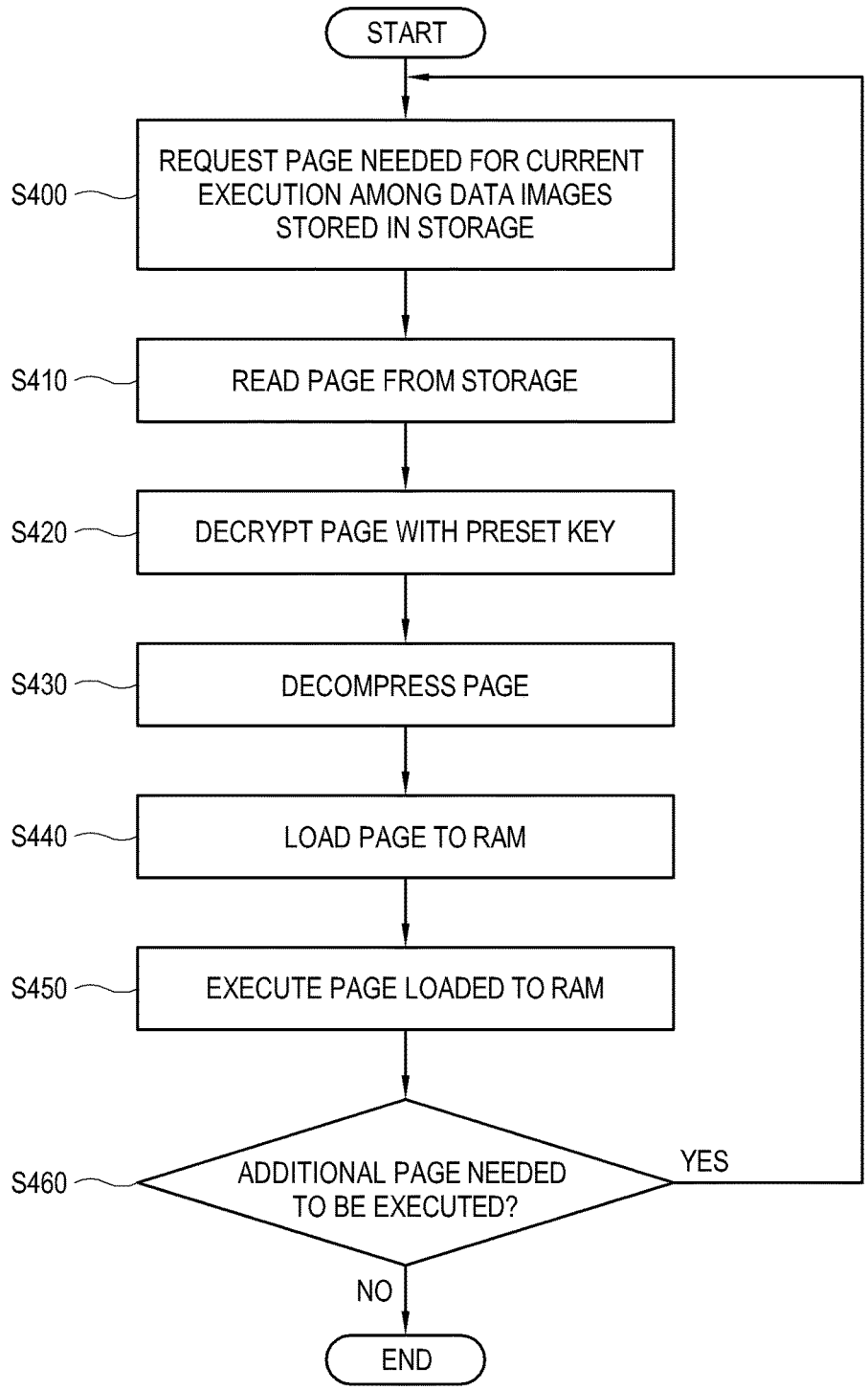
FIG. 8 is a flowchart showing a method of controlling an image processing apparatus according to a third exemplary embodiment.

FIG. 8 is a flowchart showing a method of controlling the image processing apparatus 100 according to a third exemplary embodiment.

As shown in FIG. 8, at operation S400 the CPU 121 makes a request for a page needed for performing the current execution in a data image stored in the storage 150.

At operation S410 the storage controller 160 reads the corresponding page from the storage 150. The storage controller 160 temporarily stores and processes the read page in the buffer 161. The data image is encrypted in units of a page and stored in the storage 150.

At operation S420, the storage controller 160 decrypts the corresponding page. The storage controller 160 has a key for decrypting the encrypted page, and performs the decryption based on the key.

If the decrypted page is in a compressed state, at operation S430 the storage controller 160 decompresses the compressed page. At operation S440, the storage controller 160 loads the page to the RAM 122.

At operation S450, the CPU 121 executes the page loaded to the RAM 122, thereby executing the data image. As the corresponding page is executed, at operation S460 the CPU 121 determines whether there is a need for executing an additional page. If it is determine that there an additional page to execute, the CPU 121 returns to operation S400 and repeats the same processes.

In brief, the storage controller 160 according to the third exemplary embodiment uses a preset decryption key to decrypt the encrypt page instead of using the separately added signature as a method of validating the page. If the page stored in the storage 150 is falsified, the key provided in the storage controller 160 cannot decrypt this page. Therefore, when the page is falsified, it is possible to prevent the execution of the corresponding page.

The foregoing exemplary embodiments are applied to secure booting, but may be applied when a typical application is executed. That is, when a validation procedure is applied to an application, only binary code which needed for currently executing the application among all the binary codes is read from the storage 150 and validated and then loaded to and executed in the RAM 122. That is, processes for reading and validating binary code which is needed on each occasion is repeated. Thus, it is possible to minimize the relative delay of the application as compared with a case where all the binary codes of the application are loaded to the RAM 122 and then validated.

Although a few exemplary embodiments have been shown and described, it will be appreciated by those skilled in the art that changes may be made in these exemplary embodiments without departing from the principles and spirit of the inventive concept, the scope of which is defined in the appended claims and their equivalents.

What is claimed is:

1. An image processing apparatus comprising:
a storage configured to store a plurality of codes for executing an application;
a random access memory (RAM) configured to be loaded with at least one of the plurality of codes stored in the storage;
a processor configured to execute the at least one of the plurality of codes loaded to the RAM; and
a storage controller configured, in response to receiving a request from the processor for executing the plurality of codes, to perform a first validation on a first code among the plurality of codes and load the first code, which is determined to be valid, to the RAM so that the processor executes the application by executing the first code loaded to the RAM,
wherein the storage controller is further configured to perform a second validation on a second code among the plurality of codes after the first code is loaded to the RAM and executed through the processor,
wherein the first code is compressed and stored in the storage in a preset compression format, and
wherein the storage controller is further configured to perform the first validation based on a preset validation code corresponding to the first code, decompress the first code, and load the decompressed first code, which is determined to be valid, to the RAM.

2. The image processing apparatus according to claim 1, wherein the preset validation code is generated and set by converting unfalsified each code based on a preset algorithm, and
wherein the storage controller converts the each code in accordance with the preset algorithm, and compares the converted each code with the preset validation code in order to determine whether the each code is falsified.

3. The image processing apparatus according to claim 2, wherein the preset validation code comprises a hash code based on a hash function.

4. The image processing apparatus according to claim 1, wherein each code is encrypted according to the respective code and stored in the storage, and
wherein the storage controller decrypts the encrypted each code based on a preset decryption key, and loads the each code which are decrypted normally to the RAM.

5. The image processing apparatus according to claim 1, wherein the processor makes the request for each code needed for executing the plurality of codes to the storage controller, and executes the each code which is loaded in the RAM in response to the request.

6. The image processing apparatus according to claim 1, further comprising a buffer configured to temporarily store the first code when the storage controller performs the first validation on the first code.

7. The image processing apparatus according to claim 1, wherein the storage controller performs validation on each code in order to prevent the each code stored in the storage from being executed in a falsified state.

8. The image processing apparatus according to claim 1, wherein the first validation on the first code is performed using a signature comparison.

9. The image processing apparatus according to claim 1, wherein the first validation on the first code is performed using a preset decryption key.

10. A method of controlling an image processing apparatus, the method comprising:
storing a plurality of codes in a storage for executing an application;
in response to receiving a request from a processor for executing the plurality of codes, performing a first validation on a first code among the plurality of codes;
loading the first code, which is determined to be valid, to the RAM;
executing the application by executing the first code loaded to the RAM through the processor, and
performing a second validation on a second code among the plurality of codes after the first code is loaded to the RAM and executed through the processor,
wherein the first code is compressed and stored in the storage in a preset compression format,
wherein the performing the first validation comprises performing the first validation based on a preset validation code corresponding to the first code, and
wherein the loading the first code comprises decompressing the first code, and loading the decompressed first code, which is determined to be valid, to the RAM.

11. The method according to claim 10, wherein the preset validation code is generated and set by converting unfalsified each code based on a preset algorithm, and
the method further comprises preventing the each code stored in the storage from being executed in a falsified state, wherein the preventing comprises:
converting the each code in accordance with the preset algorithm; and
comparing the converted each code with the preset validation code in order to determine whether the each code is falsified.

12. The method according to claim 11, wherein the preset validation code comprises a hash code based on a hash function.

13. The method according to claim 10, wherein
the method further comprises preventing the first code stored in the storage from being executed in a falsified state.

14. The method according to claim 10, wherein the first code is encrypted according to the respective each code and stored in the storage, and
the method further comprises preventing the each code stored in the storage from being executed in a falsified state, wherein the preventing comprises decrypting the encrypted each code based on a preset decryption key, and loading the normally decrypted each code to the RAM.

15. The method according to claim 10, wherein the performing validation further comprises temporarily storing each code in a separate buffer.

* * * * *